United States Patent [19]

Sakamoto et al.

[11] 4,023,541
[45] May 17, 1977

[54] COMBUSTION CHAMBER FOR INTERNAL-COMBUSTION ENGINE

[75] Inventors: Akehiro Sakamoto, Chiryu; Yoshio Watanabe, Ohbu, both of Japan

[73] Assignee: Kabushiki Kaisha Toyoda Jidoshokki Seisakusho, Kariya, Japan

[22] Filed: Mar. 12, 1973

[21] Appl. No.: 340,106

[30] Foreign Application Priority Data

| | | |
|---|---|---|
| Mar. 17, 1972 | Japan | 47-27632 |
| May 23, 1972 | Japan | 47-50921 |
| May 23, 1972 | Japan | 47-50922 |

[52] U.S. Cl. .................. 123/32 E; 123/32 B; 123/32 ST; 123/193 CP
[51] Int. Cl.² .................................. F02B 19/10
[58] Field of Search ............ 123/30 D, 32 R, 32 E, 123/32 ST, 32 B, 32 C, 193 CP, 193 P

[56] References Cited

UNITED STATES PATENTS

| | | | |
|---|---|---|---|
| 2,076,030 | 7/1930 | Kahllenberger | 123/32 E |
| 2,699,763 | 1/1955 | Bensinger | 123/32 |
| 2,935,054 | 5/1960 | Franke et al. | 123/32 B |
| 3,105,470 | 10/1963 | Hockel et al. | 123/32 B |
| 3,919,982 | 11/1975 | Goto et al. | 123/32 E |

OTHER PUBLICATIONS

Allen Property Custodian Ser. No. 383,510, Pischinger et al., May, 1943.

*Primary Examiner*—C. J. Husar
*Assistant Examiner*—David D. Reynolds
*Attorney, Agent, or Firm*—Wenderoth, Lind & Ponack

[57] ABSTRACT

A swirl chamber type combustion chamber for an internal-combustion engine is divided into a main combustion chamber and a swirl chamber connected through a passageway with the main combustion chamber. The main combustion chamber includes a clearance part defined between a cylinder head and a piston of the engine, a concavity or piston chamber provided in the upper surface of the piston, and an air reservoir.

The air reservoir is preferably provided in portions of the piston upper surface where the concavity of the main combustion chamber is not present. It is preferable, but not essential, that the air reservoir have a suitable number of holes with a diameter-deepness ratio of 1 to 4 arranged symmetrically with respect to the concavity so that a line connecting the centers of the piston and each hole makes an angle of substantially 30° to 120° with a longitudinal center line of the concavity.

9 Claims, 11 Drawing Figures

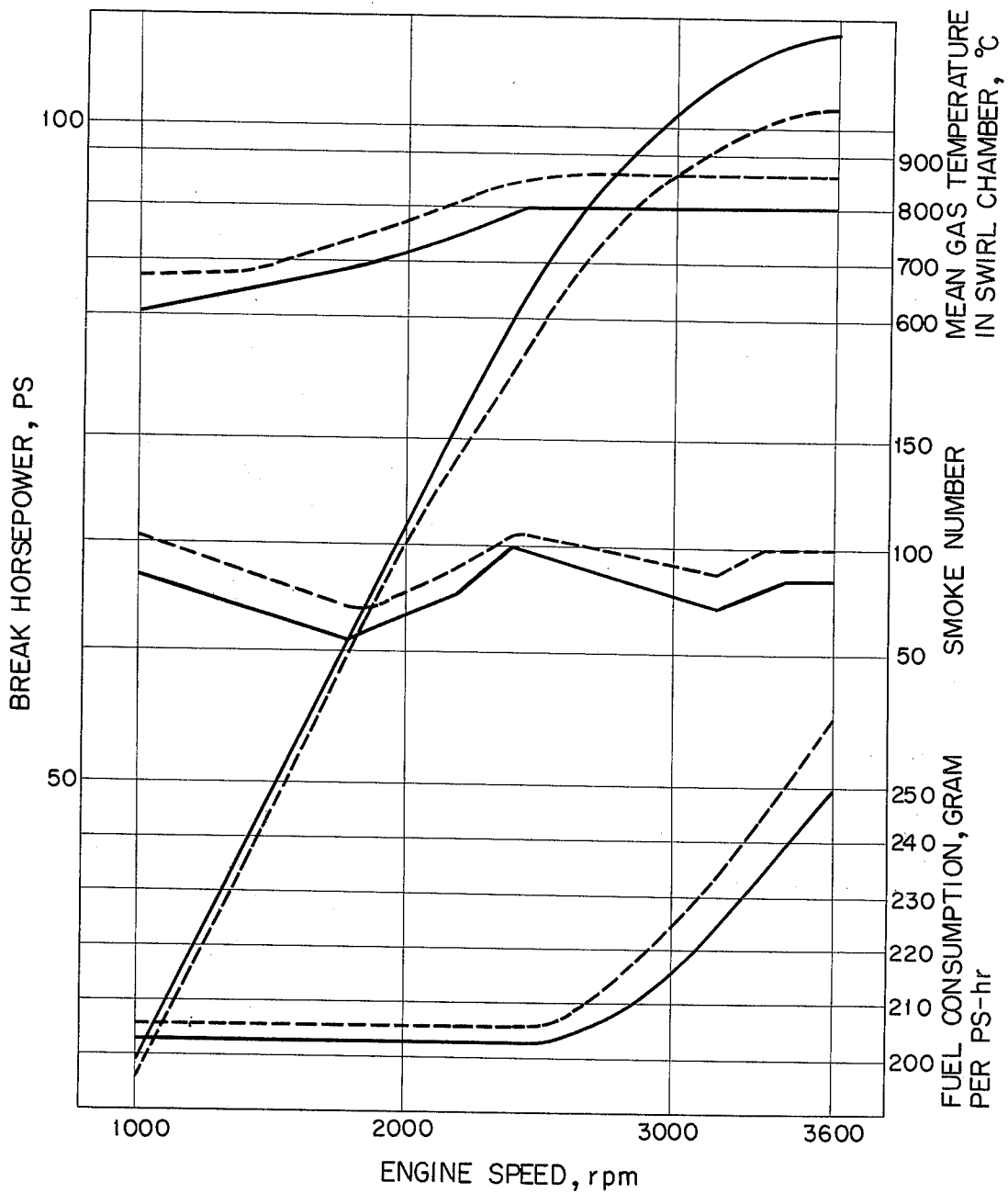
FIG. 4A [ANGLE θ = 75°]

FIG. 4B [ANGLE θ=30°]
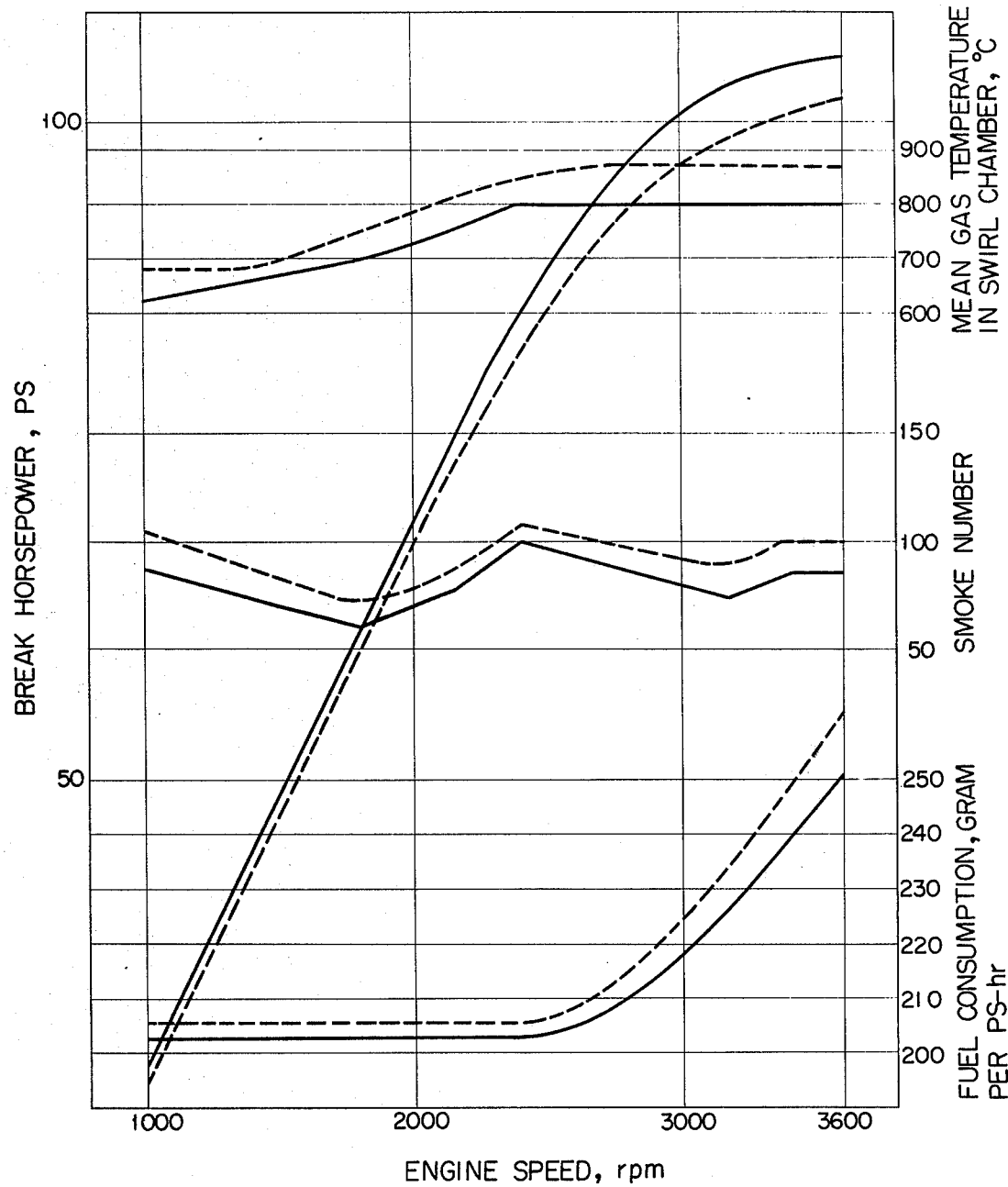

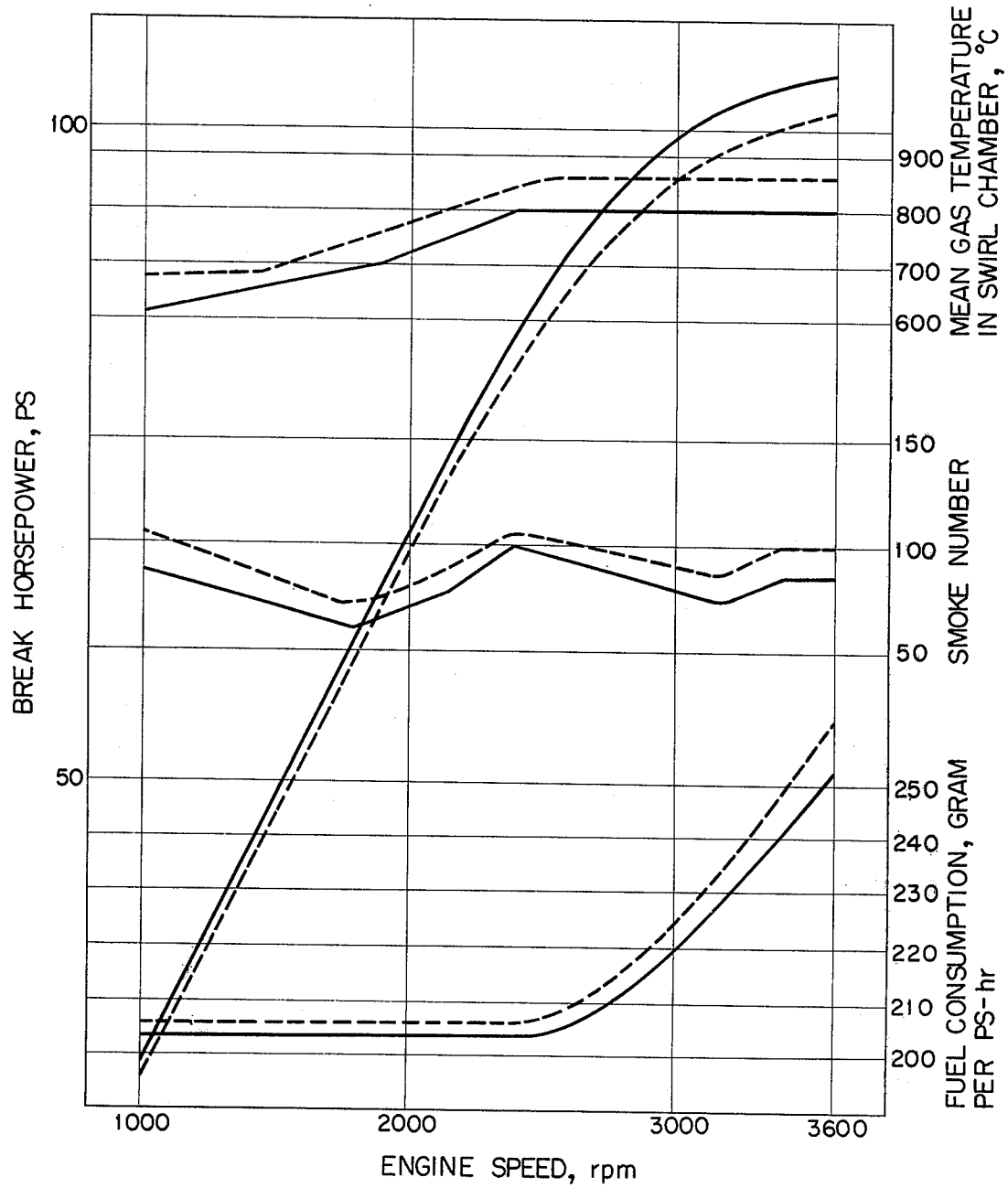
FIG. 4C [ANGLE θ=120°]

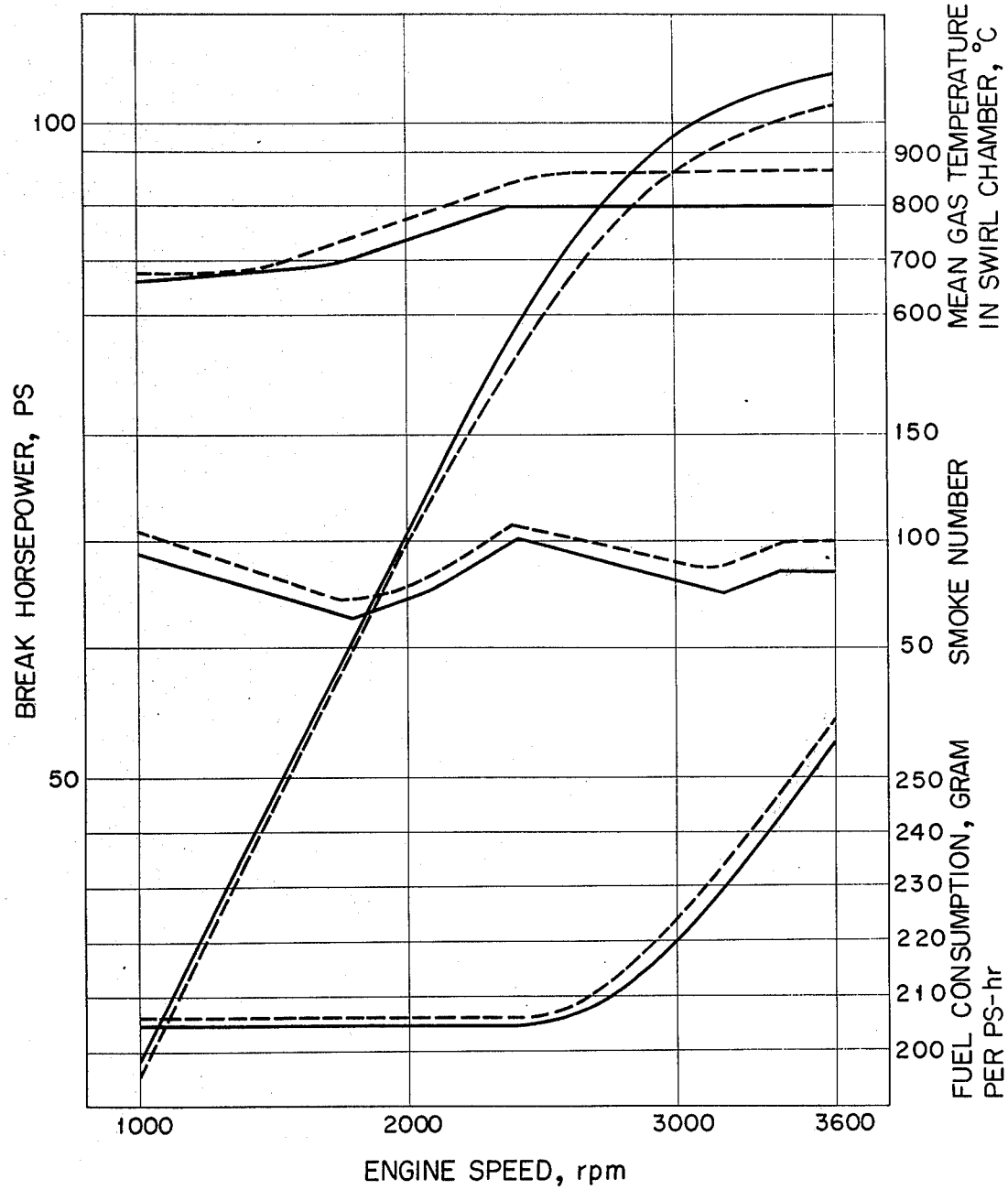
FIG. 4D [ANGLE θ=150°]

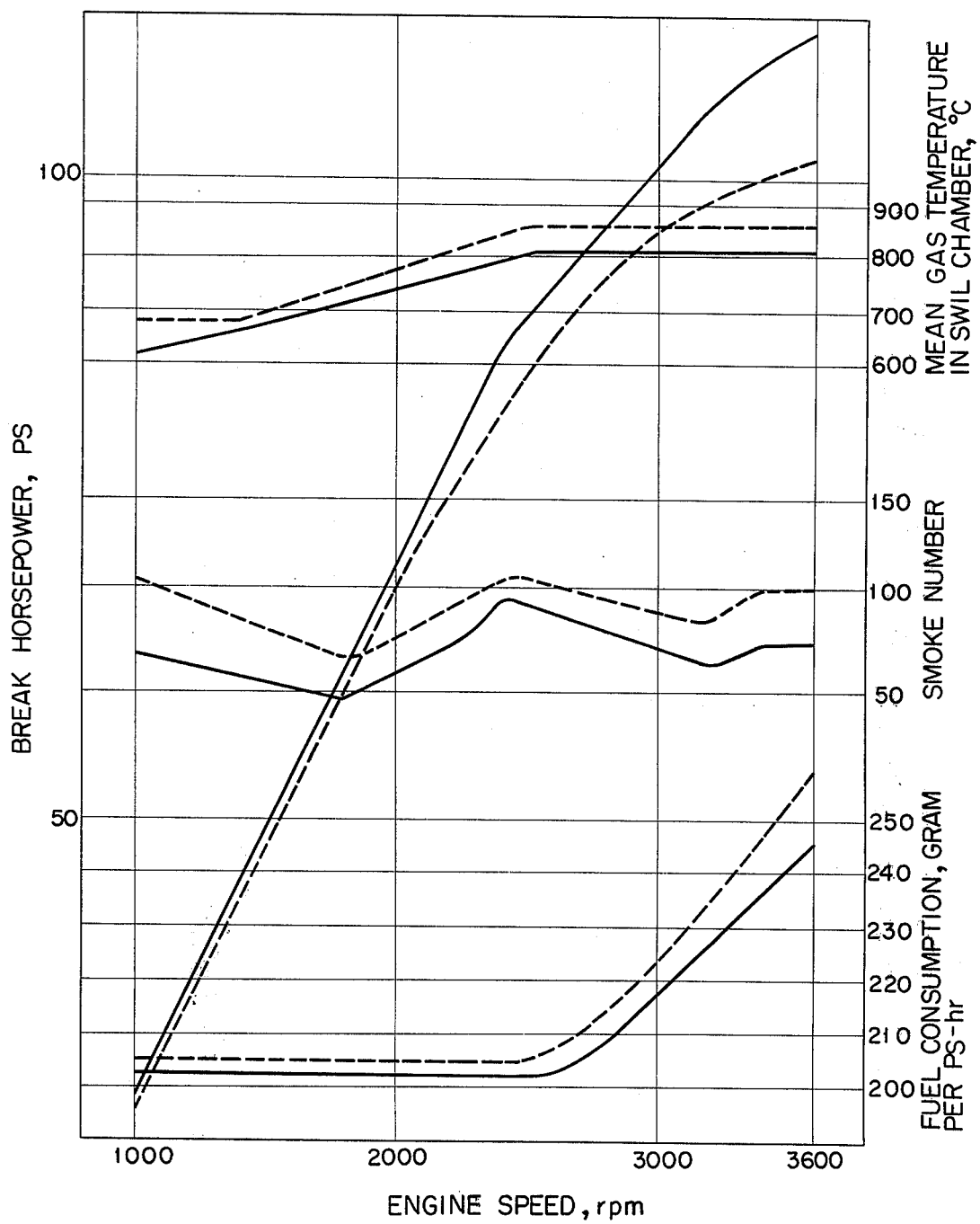
FIG. 5A [DIAMETER-DEEPNESS RATIO D/d = 1⁷⁄₈, ANGLE θ=75°]

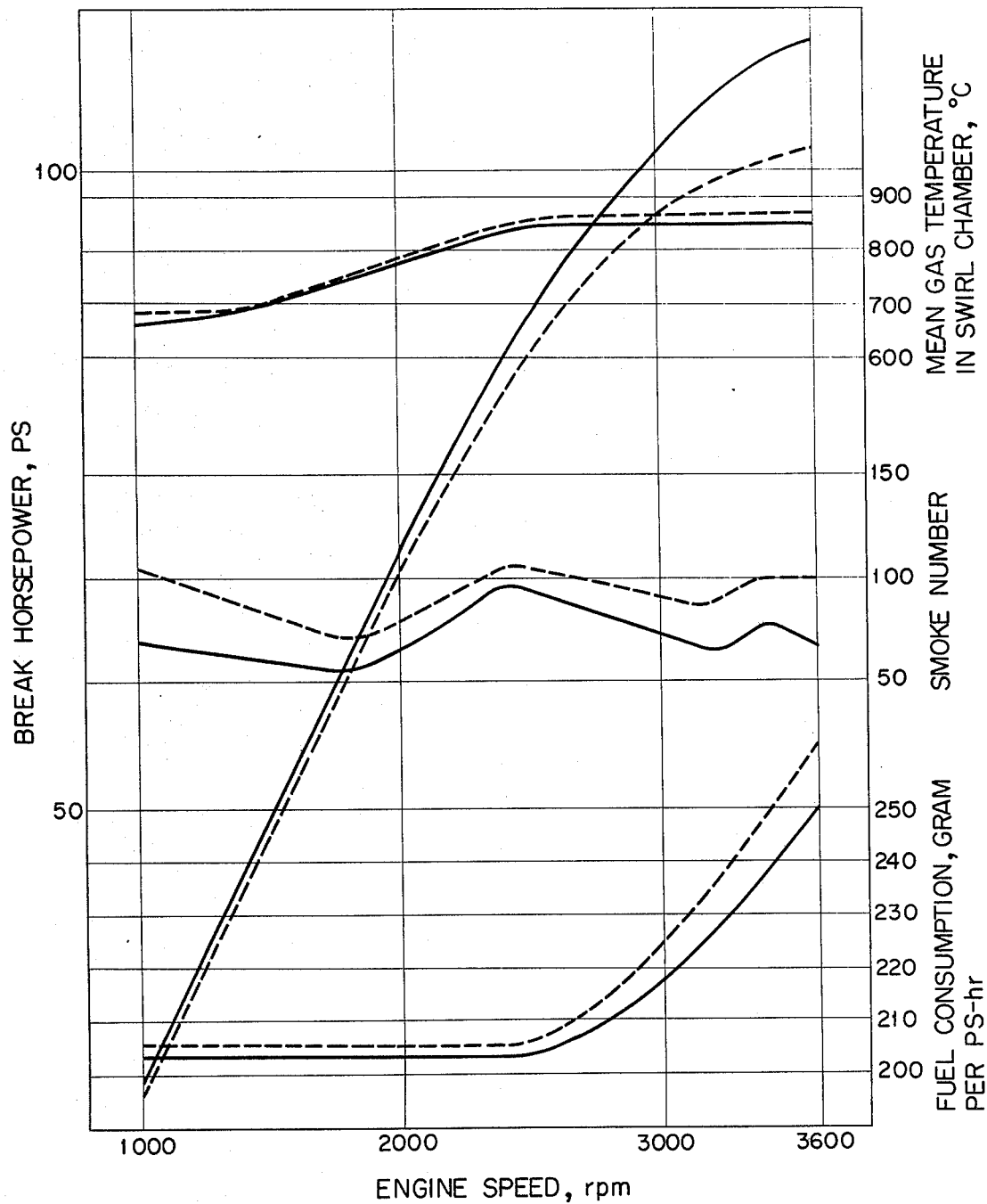
FIG. 5B [DIAMETER-DEEPNESS RATIO $D/d = 20/5$, ANGLE $\theta = 75°$]

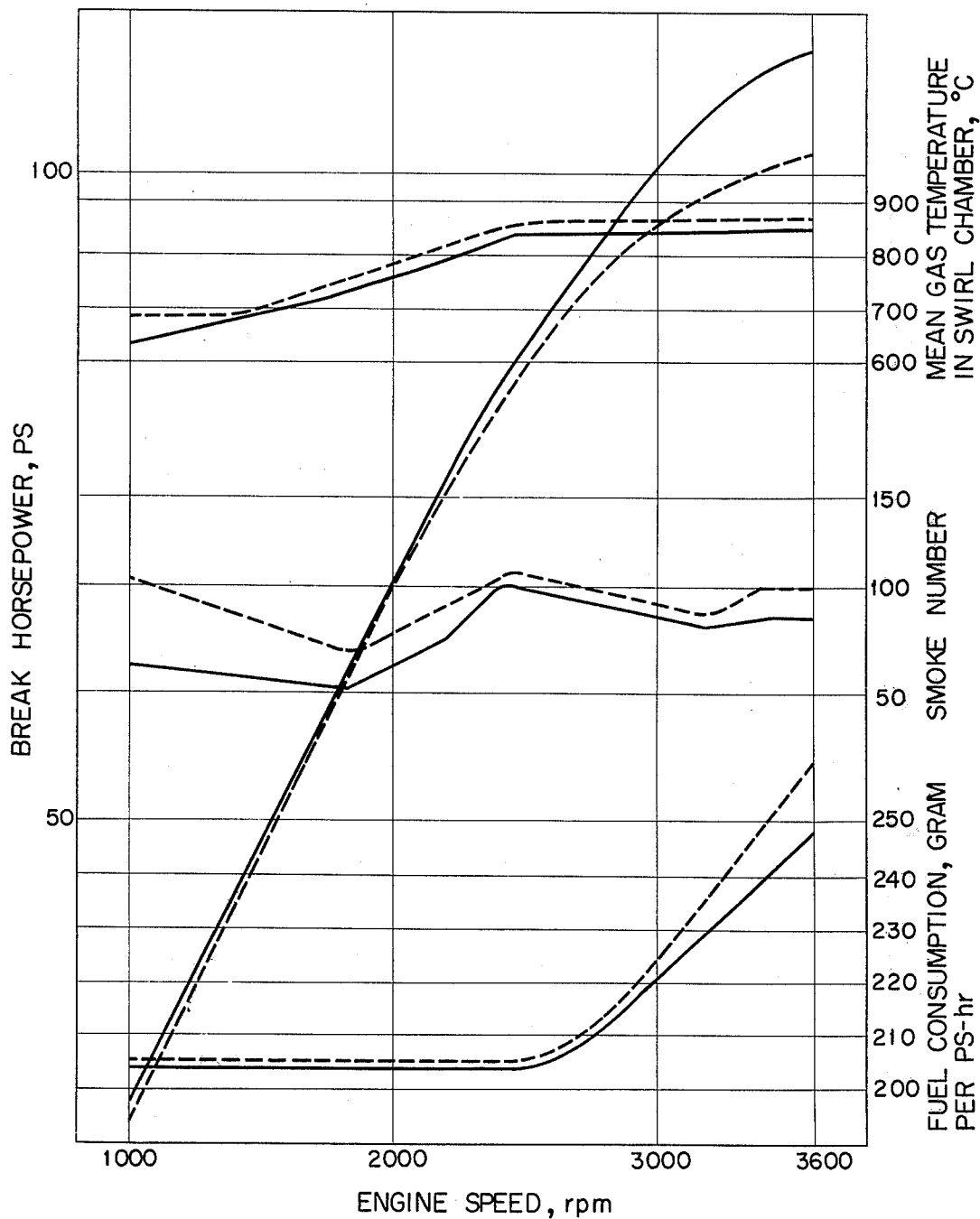
FIG. 5C [DIAMETER-DEEPNESS RATIO D/d = 13/13, ANGLE θ = 75°]

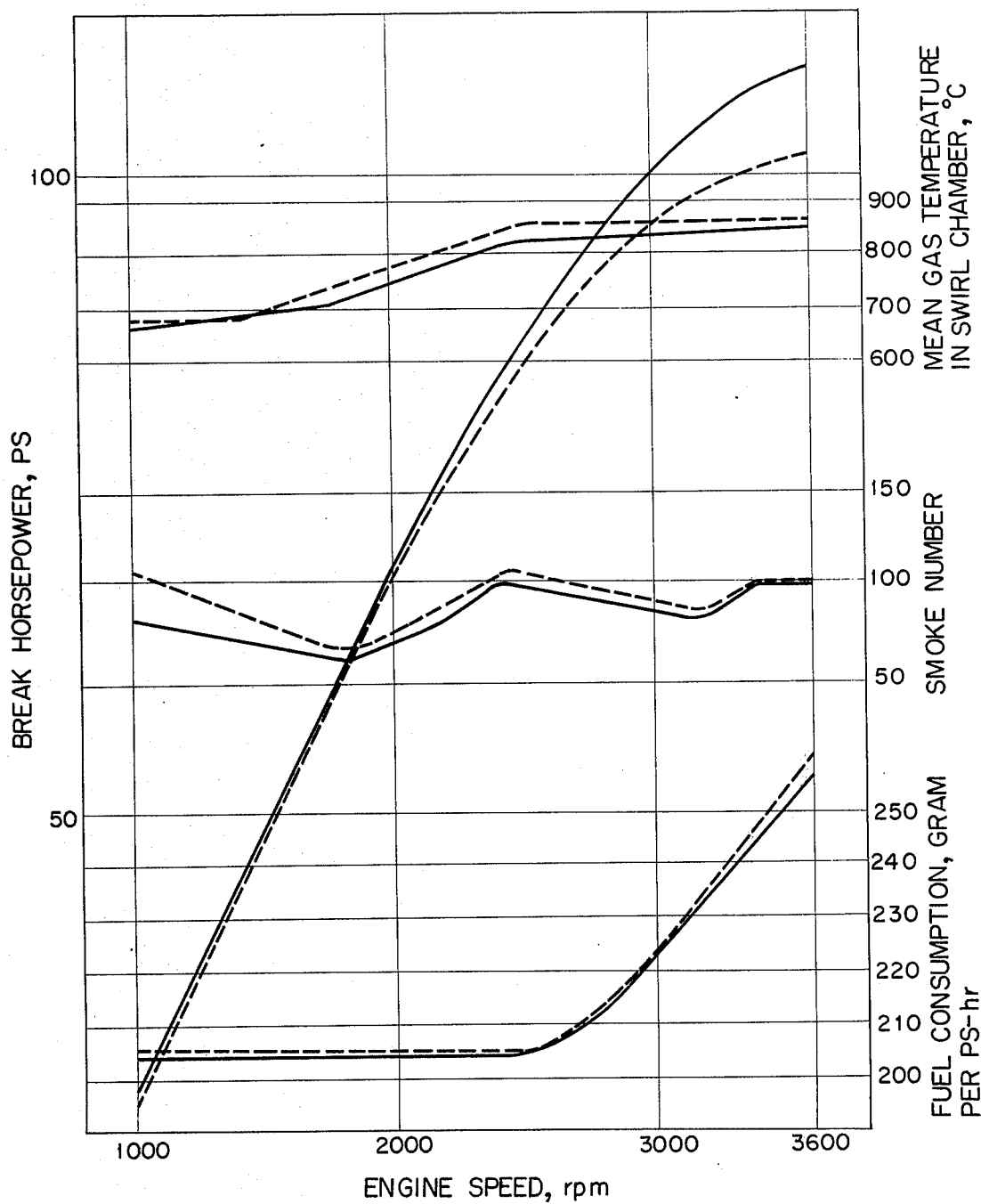
FIG. 5D [DIAMETER-DEEPNESS RATIO $D/d = 12/16$, ANGLE $\theta = 75°$]

COMBUSTION CHAMBER FOR INTERNAL-COMBUSTION ENGINE

BACKGROUND OF THE INVENTION

This invention relates to an internal-combustion engine and more particularly to a combustion chamber for a Diesel engine.

Hitherto known combustion chambers for compression ignition engines can be broadly classified into two types, an open chamber type and a divided chamber type. All these combustion chambers necessarily have a small displacement when combustion occurs because of the use of a high compression ratio, and these combustion chambers have to complete combustion in the short time available. In order that complete combustion may be accomplished under such severe conditions, various combustion chamber designs for producing high turbulence and good mixing of the atomized fuel and air have been investigated. However, since combustion is restricted by time and combustion space as aforesaid, it has been difficult to provide a combustion chamber in which the good mixing of the atomized fuel and air can be achieved effectively and the combustion can be accomplished completely. Therefore, due to incomplete combustion, exhaust gases from the conventional internal-combustion, engine contain much black smoke which must be restricted in order to protect the environment. Heretofore, the restriction on the degree of blackness of the exhaust gases, i.e., the smoke number has been imposed by sacrificing engine horsepower.

Owing to the abovementioned circumstances, much study has been given an increase of engine horsepower while lowering the degree of blackness or the smoke number of the exhaust gases in the field of engine manufacturing. The resulting internal-combustion engine, however, has required a complex cylinder head and the increase in horsepower has been attended with a temperature increase in the swirl chamber, causing thermal damage to the cylinder head.

It is therefore an object of the present invention to provide an internal-combustion engine containing a combustion chamber wherein high turbulence is achieved to complete combustion and which serves to improve performance of the internal-combustion engine and to lower the smoke number of exhaust gases.

SUMMARY OF THE INVENTION

In accordance with the invention, the above object is achieved by having an internal-combustion engine provided with a combustion chamber, which comprises a clearance defined between a cylinder head and a piston of the engine, a concavity provided in the upper surface of the piston, and an air reservoir provided in either the lower surface of the cylinder head or the upper surface of the piston with an open end thereof opposed to the clearance part. By providing the air reservoir, after the piston moves downwardly starting from a top dead center thereof, high turbulence of the air and good mixing of the atomized fuel and air continue to be established in the combustion chamber. Preferably, the air reservoir of the combustion chamber comprises a suitable number of holes, having a diameter-deepness ratio of 1 to 4, which are provided in the upper surface of the piston in symmetric relation with respect to the concavity so that a line connecting the center of the piston upper wall and the center of each of the holes makes an angle of substantially 30° to 120° with a longitudinal center line of the concavity.

BRIEF DESCRIPTION OF THE DRAWINGS

The invention will become more apparent from reading the following detailed description in connection with the accompanying drawings, in which:

FIGS. 4(A) to 4(D) and 5(A) to 5(D) are performance curves obtained by testing of the conventional internal-combustion engine and the present Diesel engine.

DETAILED DESCRIPTION OF THE PREFERRED EMBODIMENT

The present invention will be described with respect to a divided chamber type combustion chamber and more particularly to a swirl chamber type combustion chamber of the divided chamber type, but may be applied to other types of combustion chambers, for example, a direct injection type, a pre-combustion chamber type and an air chamber type combustion chambers, and a combustion chamber for spark-ignited engines.

Figure 1:
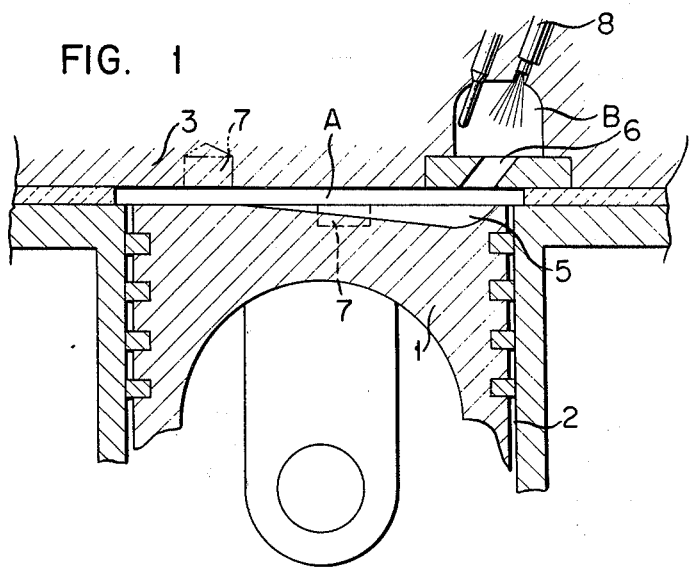
FIG. 1 is a fragmental sectional view of an internal-combustion engine containing a combustion chamber incorporated with the invention.

Referring now to FIG. 1, there is shown, by way of example, part of a four-stroke-cycle Diesel engine with a swirl chamber type combustion chamber, which comprises a cylinder block formed with one or more cylinder bores 2 a piston 1 with piston rings is disposed in each of the cylinder bores 2 so as to be slidable along the wall of the associated cylinder bore 2. The movement of the piston 1 is transmitted through a connecting rod to a crank shaft (not shown) in a well known manner. The engine further comprises a cylinder head 3 connected through a cylinder gasket with the cylinder block to define a main combustion chamber A between the upper surface of the piston 1 and the lower surface of the cylinder head 3.

In the swirl chamber type, a combustion chamber is divided into two parts, the major or main part A being between the piston 1 and the cylinder head 3 and connected by a small passageway or throat 6 to the minor or swirl chamber part B located in the cylinder head 3. The piston if formed with a wedge-shaped concavity 5 which forms a piston chamber part of the main combustion chamber A.

Figure 2:
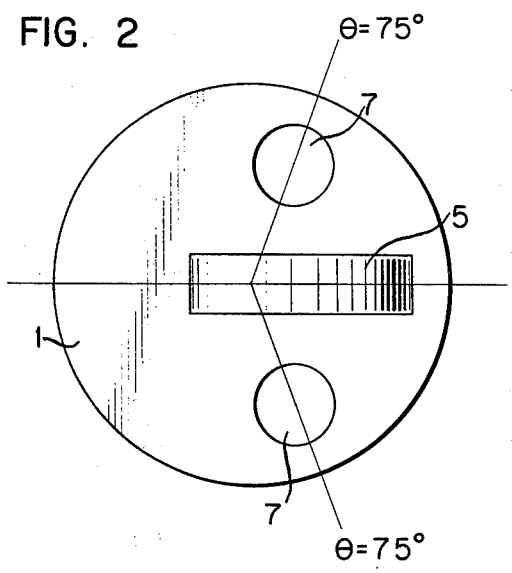
FIG. 2 is a plan view of a piston shown in FIG. 1.
Figure 3:
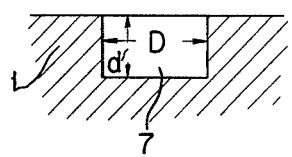
FIG. 3 is a fragmental sectional view of the piston, showing a diameter-deepness relation of an air reservoir hole provided in the piston according to the invention.

According to the present invention, the main part A of the combustion chamber comprises an air reservoir part 7 which preferably comprises a suitable number of substantially cylindrical holes or — in this example, two holes — provided in the upper surface of the piston at positions remote from the outlet end of the passageway 6 and near the concavity 5. The air reservoir hole 7 is deeper than the concavity 5. As shown in FIG. 2, the holes 7 are arranged in symmetric relation with respect to the concavity 5 and each of the holes 7 preferably makes an angle of $\theta = 75°$ with the longitudinal center line of the concavity 5. The angle $\theta$ may be varied substantially, for instance, from 30° to 120°. It is understood from FIGS. 4(A) to 4(D) that the angle $\theta$ is one of the principal factors that can improve the performances of the engine; and, that with a 75° angle, the main gas temperature in the swirl chamber B, the smoke number of exhaust gases, the fuel consumption and the brake horsepower of the engine can be most improved as compared with the conventional Diesel engine, shown by the dotted lines in FIGS. 4(A) to 4(D), not having an air reservoir part. In addition, it is understood from FIGS. 5(A) to 5(D) that by changing the ratio of deepness $d$ to diameter D of the air reservoir hole 7, the performances of the engine are varied. The air reservoir holes having the diameter-deepness ratio of about 2 and the angle of about 75° provide a most efficient engine. The diameter-deepness ratio may be varied substantially, for instance, from 1 to 4.

While, in the preferred embodiment, the air reservoir holes are provided in the upper surface of the piston, they may be provided in the lower surface of the cylinder head in the same manner as described with respect to the preferred embodiment, as shown by an imaginary line in FIG. 1.

In operation, each cycle of the engine is completed by four strokes. In the suction stroke, the piston 1 moves downwardly in the cylinder bore 2 from the top dead center and an intake valve (not shown) opens to supply a fresh charge of air into the cylinder bore 2. Then, the piston 1 reaches the bottom dead center. In the next compression stroke, the air in the cylinder bore is compressed with both the intake and exhaust valves closed. At this time, the compressed air fills the swirl chamber B, and the main combustion chamber A including the piston chamber 5 and the air reservoir 7. When the piston 1 nears the top of its upward travel, the fuel is injected through an injection valve 8 into the swirl chamber B and mixed with the vortex flow of the high-pressure and -temperature air. The fuel is ignited, when conditions for ignition such as a mixing ratio and a temperature obtain, by the heat of compression at various points in the combustion chamber and flame travels in all possible directions through the mixture. The resulting high pressure from the heated mixture forces the piston down during the power stroke. In the meantime, both the portion of the mixture which was unburned in the swirl chamber because of an insufficient fuel-air ratio and the atomized fuel successively injected through the injection valve 8 are directed through the passageway or throat 6 toward the piston chamber 5 and mixed, in the main combustion chamber A, with a flow of fresh air resulting from the issue of compressed air from the air reservoir part 7, re-establishing a complex flow of the unburned mixture in the main combustion chamber A and thereby causing the unburned mixture to have an air-fuel ratio sufficient to be ignited. Thus, the combustion continues during the power stroke. Near the end of the power stroke (bottom dead center), the exhaust valve opens and allows spent gases to escape. The piston 1 rises again during the exhaust stroke, forcing the rest of the exhaust gases out and completing the cycle.

It is therefore understood that, according to the present invention, high turbulence and good mixing of the air and fuel can be provided on the power stroke by having the air reservoir holes 7 arranged symmetrically on the opposite sides of the piston chamber 5 so as not to be directly opposite the outlet end of the throat 6 connecting the main combustion chamber A and the swirl chamber B. This causes a more complete combustion to be accomplished over the time from the beginning of fuel injection to the end of combustion in the main combustion chamber A, i.e., over the time from the commencement of ignition to the end of after burning, with the attendant advantages that, for instance, as will be seen from the curves on FIGS 4(A) to 4(D) and 5(A) to 5(D), the exhaust gases contain less carbon and consequently the degree of blackness or the smoke number thereof is highly decreased.

In addition, according to the present invention, the main combustion chamber has a larger in combustion space as compared with the conventional main combustion chamber not having the air reservoir. This air reservoir minimized the difference in temperature between any points in the combustion chamber. It is accordingly possible to avoid an occurrence of a thermal strain which, in the conventional combustion chamber, frequently happens due to higher temperature of the swirl chamber in comparison with that of the main combustion chamber. The present invention exhibits the practical effect, such as, a high durability of the cylinder head.

What is claimed is:

1. In an internal-combustion engine of the compression ignition liquid fuel injection type having a cylinder, at least one piston reciprocative in the cylinder, a cylinder head disposed on the cylinder, a combustion chamber defined by the cylinder, the lower surface of the cylinder head and the upper surface of the piston, said lower surface and said upper surface constituting wall portions of said combustion chamber, a prechamber provided in the cylinder head so as to be in communication with the combustion chamber through a throat and into which a stream of fuel is directed, a wedge-shaped rectangular concavity provided in the upper surface of the piston in communication with the combustion chamber; the improvement comprising an air reservoir formed in one of the wall portions of the combustion chamber and spaced from the wedge-shaped rectangular concavity, the air reservoir being open at a maximum diameter portion thereof to the combustion chamber, whereby the air reservoir fills with compressed fresh air during a compression stroke of the engine and issues the compressed fresh air into the combustion chamber during a power stroke of the engine to promote complete combustion.

2. The improved internal-combustion engine recited in claim 1, wherein the air reservoir comprises at least one pair of holes provided at positions spaced radially in opposite directions from the longitudinal center line of the wedge-shaped rectangular concavity.

3. The internal-combustion engine of claim 2, wherein each of the air reservoir holes is positioned on a line making an angle of about 30° to 120° with the longitudinal center line of the rectangular concavity.

4. The internal-combustion engine of claim 3 wherein a ratio of diameter to deepness of each of the air reservoir holes is about 1 to 4.

5. The internal-combustion engine of claim 1, wherein the air reservoir is in the upper surface of the piston.

6. The internal-combustion engine of claim 1, wherein the air reservoir is in the lower surface of the cylinder head.

7. In an internal-combustion engine of the compression ignition liquid fuel injection type having a cylinder, at least one piston reciprocative in the cylinder, a cylinder head disposed on the cylinder, a swirl chamber provided in the cylinder head in communication with the cylinder through a throat, and a rectangular piston chamber provided in the upper surface of the piston, the improvement which comprises: said piston having at least one pair of air reservoir holes provided in the upper surface thereof symmetric with a longitudinal center line of the piston chamber on a line making an angle of about 30° to 120° with the longitudinal center line of the piston chamber, each of the air reservoir holes being deeper than the rectangular piston chamber.

8. The internal-combustion engine of claim 7, wherein a ratio of diameter to deepness of each of the air reservoir holes is of a value of about 1 to 4.

9. In an internal-combustion engine having a cylinder block with at least one bore, a cylinder head disposed on the cylinder, a piston reciprocable in the cylinder bore, and the combustion chamber defined between the lower surface of the cylinder head and the upper surface of the piston, the improvement comprising: said piston having a wedge-shaped rectangular concavity formed in the upper surface thereof and forming part of the combustion chamber, an air reservoir formed in one of the upper surfaces of the piston and the lower surface of the cylinder head so that an open end thereof, through which the air reservoir communicates with the combustion chamber, is not directly opposed to a flow of injected fuel, said air reservoir being comprised of a pair of cylindrical holes arranged in symmetric relation with respect to a longitudinal central line of the wedge-shaped rectangular concavity, each cylindrical hole having a diameter-deepness ratio of approximately 1 to 4 and line connecting centers of each cylindrical hole and the piston making an angle of approximately 30° to 120° with the longitudinal center line of the wedge-shaped rectangular concavity, said cylinder head having a swirl chamber formed therein and connected by a passageway with the combustion chamber, fuel being injected into the swirl chamber, said wedge-shaped rectangular concavity positioned relative to said passageway such that a deeper portion of said concavity is directly opposed to the outlet of said passageway, whereby the air reservoir filled with compressed fresh air during a compression stroke of the engine issues the compressed fresh air into the combustion chamber during a power stroke of the engine to promote complete combustion.

* * * * *